A. HOLTER.
BUTTON FIXTURE.
APPLICATION FILED FEB. 2, 1915.
1,156,231. Patented Oct. 12, 1915.

UNITED STATES PATENT OFFICE.

ALFRED HOLTER, OF RJUKAN, NORWAY.

BUTTON-FIXTURE.

1,156,231.   Specification of Letters Patent.   Patented Oct. 12, 1915.

Application filed February 2, 1915. Serial No. 5,702.

*To all whom it may concern:*

Be it known that I, ALFRED HOLTER, a subject of the King of Norway, residing at Rjukan, Norway, have invented certain new and useful Improvements in Button-Fixtures; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My present invention relates to improvements in button fixtures, and the object of my invention is to provide a button fixture which will enable any button to be fastened to the fabric by pressure and without the use of needle and thread.

Previously there are known buttons, which consist of two parts, and which may be fastened to the fabric by pushing a pointed stud on one part through the fabric and inserting it into a recess in the other part, said recess being provided with yielding means for preventing the release of said stud. These button fixtures however have several disadvantages. Firstly the whole button generally must consist of metal. Secondly, one part of the button will always have to be on the inside of the fabric, so that these buttons can only be used, where the inside of the fabric does not show. A further disadvantage lies therein that the hole caused by the fastening stud will by and by be enlarged and the fabric will be torn. According to my present invention all the said disadvantages are avoided by providing a button fixture by means of which any ordinary button may be securely fastened to the fabric without damaging the same and without the use of a double button part of which is shown on each side of the fabric.

On the drawings: Figures 1-4 show one form of my improved button fixture. Figs. 5 and 6 show this form of fixture as used for fastening a button. Figs. 7-10 show another form of my improved button fixture. Figs. 11 and 12 illustrate the application of this form for fastening a button. Fig. 13 is a detail sectional view illustrating on a larger scale the method of holding together the two parts of the fixture. Figs. 14-17 show details of modified fixtures according to my invention.

According to Figs. 1-6 my button fixture consists of a barbed staple, Figs. 1 and 2, and a hollow staple, Figs. 3 and 4, the tubelike ends of which are adapted to receive the barbed ends on the wire staple shown on Figs. 1 and 2, means being provided for preventing the extraction of the barbed staple ends, when they have been inserted into the hollow staple. The said means may consist in yielding tabs, hooks or projections or other known devices for holding the barb against movement in one direction, and several forms of such stopping means will be described below. Figs. 5 and 6 illustrate the use of the fixture shown on Figs. 1-4 for fastening a button. As it will be seen the hollow staples are placed with their ends through the sewing holes of the button and the barbed staples are pushed through the fabric, so that their points are inserted into place in the open ends of the hollow staples.

According to Figs. 7-12 a pair of four-pointed staples is used instead of two pairs of two-pointed staples as on Figs. 1-6. Otherwise the devices and their use are exactly similar.

As seen on Fig. 13 the barbed staple may be provided with a number of barbs along the stem. This is to secure a good fixture with different thickness of fabric; one or more barbs being inserted into the end of the hollow or split staple according to the thickness of the fabric or the button. According to Fig. 13 the receiving staple consists of a wire, which is however split at the ends, the split ends being bent inward so as to receive the barbs between them and prevent their extraction. The end of the receiving staples may however also, as illustrated on Fig. 14, be tube-shaped and provided with inwardly and upwardly directed lips for receiving the barbs of the inserted staple. The part of the staple, which comes into view on the overside of the button is preferably covered with cotton or the like, or it may be colored according to the color of the buttons for which it is intended.

On Fig. 15 is illustrated another way of holding together the two parts of the fixture, the inserted staple being here provided with a long and yielding barb, which is pressed inward upon being inserted into the hollow receiving staple and expanding again into a suitable recess or opening in the side wall of the receiving staple.

According to Fig. 16 the receiving staple is formed with yielding legs which are expanded by means of the barbed or wedged points of the inserted staple, the receiving staple being in this case also provided with openings or recesses into which the barb or the inserted staple snaps when it has been brought into place.

As shown on Fig. 17 the inserted staple may be provided with a flat base around its barbed legs against which base the fabric is pressed by means of the hollow end of the receiving staple, whereby the fabric is less exposed to wear.

Besides for fastening buttons the above described device may also be used for connecting two pieces of fabric without the use of buttons, as it will be easily understood. It will also be clear, that the method of connecting the receiving staple and the inserted staple may be varied in many ways without departing from the invention.

I claim:

1. A button fastener comprising a staple having pointed barbed legs adapted to be pushed through a piece of fabric with its barbed legs fitting into the holes of a button, and a receiving staple having tubular ends adapted to receive said legs and formed with inward upturned lips adapted to engage said barbed legs.

2. A button fastener comprising a staple having pointed barbed legs adapted to be pushed through a piece of fabric with its barbed legs fitting into the holes of a button, a receiving staple having tubular ends adapted to receive said legs and formed with inward upturned lips adapted to engage said barbed legs, and a wear plate interposed between the base of the barbed legs and the ends of the receiving staple, for the purpose specified.

In testimony that I claim the foregoing as my invention, I have signed my name in presence of two subscribing witnesses.

ALFRED HOLTER.

Witnesses:
M. E. GULLORMSEN,
C. F. HANSEN.

Copies of this patent may be obtained for five cents each, by addressing the "Commissioner of Patents. Washington, D. C."